United States Patent [19]

Yamakita

[11] 4,412,304
[45] Oct. 25, 1983

[54] ELECTRONIC CASH REGISTER

[75] Inventor: Tooru Yamakita, Hamura, Japan

[73] Assignee: Casio Computer Co., Ltd., Tokyo, Japan

[21] Appl. No.: 183,630

[22] Filed: Sep. 3, 1980

[30] Foreign Application Priority Data

Sep. 10, 1979 [JP] Japan ................................ 54-115937

[51] Int. Cl.³ .......................... G06F 3/12; G06F 3/02
[52] U.S. Cl. .................................... 364/900; 364/405
[58] Field of Search ... 364/200 MS File, 900 MS File, 364/405

[56] References Cited

U.S. PATENT DOCUMENTS

| | | | |
|---|---|---|---|
| 4,064,553 | 12/1977 | Kashio | 364/200 |
| 4,138,733 | 2/1979 | Tadakuma et al. | 364/900 |
| 4,245,311 | 1/1981 | Nakamura | 364/900 X |

OTHER PUBLICATIONS

Nixdorf Computer, "Nixdorf Fassen-Systeme in Handel" 20/1002/72, pp. 2–11.

*Primary Examiner*—Thomas M. Heckler
*Attorney, Agent, or Firm*—Frishauf, Holtz, Goodman and Woodward

[57] ABSTRACT

An electronic cash register, which is so constructed as to print particular dates such as those of "off" days (i.e., business holidays) and bargain days of the store on the receipt to be issued. The particular dates to be printed on the receipt are previously memorized in a memory, and at the time of the issuance of the receipt, specific dates to be printed on the receipt are determined from the memorized particular dates and the current date.

2 Claims, 4 Drawing Figures

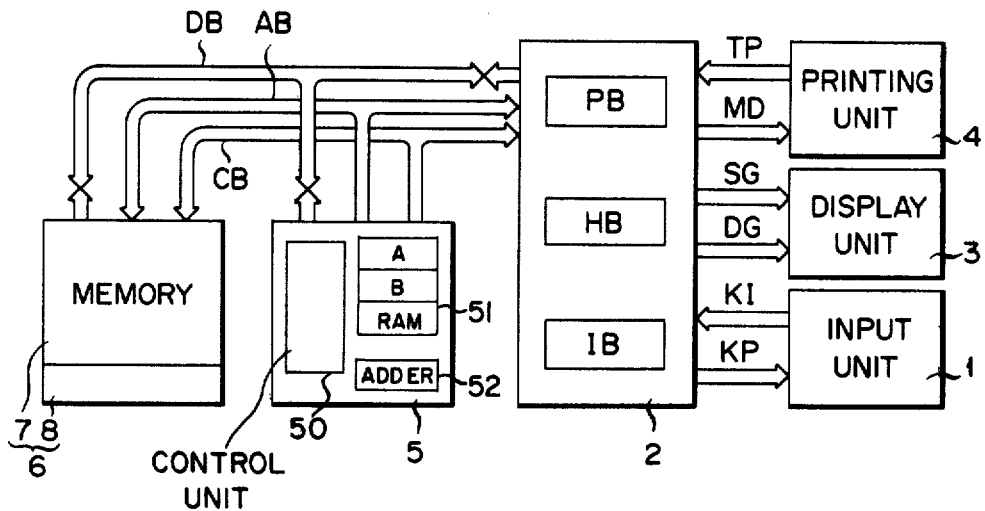

ELECTRONIC CASH REGISTER

BACKGROUND OF THE INVENTION

This invention relates to an electronic cash register, which is adapted to print particular dates such as those of the "off" days (i.e., business holidays) and bargain days of the store on the receipt to be issued.

On the receipt issued from an electronic cash register, the amounts of commodities purchased and their sum are generally printed. While the receipt can inherently serve as evidence of the payment of the indicated amount of each purchased commodity, there is something more to be indicated on the receipt from the standpoint of the information service.

For example, while the "off" days (i.e., business holidays) and bargain days of the store are posted within the store, these particular dates are likely to be forgotton or fail to be noticed, by the customer. It has been desired to improve the information service to the customer so as to make the particular dates to be reliably noticed and memorized by the customer.

SUMMARY OF THE INVENTION

The invention is intended in the light of the above affairs, and its primary object is to provide an electronic cash register, which is adapted to print on the receipt in addition to the sum of the purchased amounts the specific dates that are selected from a plurality of particular dates memorized in a particular date memory means from the comparison of these particular dates and the current or present date memorized in a current date memory means. Thus, the customer can know the particular dates such as "off" days (business holidays) and bargain days of the store in advance from the receipt every time when making purchases of commodities from that store. Thus, the possibility of visiting the store on an "off" day by mistake can be eliminated, and also the bargain days can be memorized for buying bargain sale commodities. Thus, the store can improve the information service to the customers and let the particular dates be reliably memorized by them.

This invention can be more fully understood from the following detailed description when taken in conjunction with the accompanying drawings.

BRIEF DESCRIPTION OF THE DRAWINGS

FIG. 1 schematically shows an embodiment of the invention;

FIG. 2 shows a format of particular date memory areas in a memory in the same embodiment;

DETAILED DESCRIPTION

Figure 4:
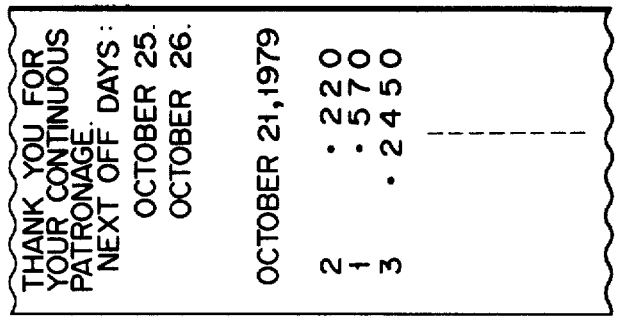
FIG. 4 shows a printed receipt sheet issued from the same embodiment.

Referring to FIG. 1, reference numeral 1 designates an input unit. The input unit 1 is provided with various keys such as entry keys and a cash amount tendered key and also a mode switch for specifying various modes such as "register" and "preset" modes. This input unit 1 is supplied with a sampling timing signal KP from an input/output (I/O) port or circuit 2. When a keying operation is made in the input unit 1, the timing signal KP is selected according to the operated key or keys to produce a key input signal KI which is coupled to an input buffer register IB provided in the I/O port 2. The I/O port 2 is provided, in addition to the input buffer register IB, with a display buffer register HB and a printing buffer register PB. The display buffer register HB is connected to a display unit 3, and the printing buffer register PB is connected to a printing unit 4.

The display unit 3 performs a display operation of digitally displaying cash amount data, etc., according to digit signal DG from the I/O port 2 and a segment signal SG obtained from the decoding of the data from the display buffer register HB. The printing unit 4 supplies a printing position signal TP representing the printing position of a printing drum (not shown) provided in it to the I/O port 2, and the I/O port 2 supplies a printing drive signal MD, which is produced in it as the result of coincidence of the printing position signal TP and the data in the printing buffer register PB, to the printing unit 4. In consequence, in the printing unit 4 predetermined hammers are driven according to the printing drive signal MD to effect printing of the cash amount data and sum data on a receipt sheet and a journal sheet.

An address designating signal, transferred from CPU 5 through the address bus line AB to the I/O port 2, designates any one of the input buffer register IB, display buffer register HB and printing buffer register PB. Input data stored in the input buffer register IB is supplied through the data bus line DB to CPU 5 by a read-out signal output from CPU 5 through the control bus line CB. Display data or printing data are written from CPU 5 through the data bus line DB to the display buffer register HB or the printing buffer register PB by a writing signal output from CPU 5 through the control bus line CB. CPU 5 includes, for example, a control section 50 for storing various microinstructions, a RAM 51 having various registers as calculation memories, such as an A-register and a B-register, and an adder circuit for performing an add/subtract operation on the data. The detailed arrangement of CPU 5 is set out in U.S. Pat. No. 4,138,733 and further explanation is omitted herein. A summing memory 6 is coupled with the CPU 5 through the data bus line DB, address bus line AB and control bus line CB. The summing memory 6 is adapted to effect data transfer according to read/write signals supplied from the CPU 5 through the control bus line CB.

FIG. 2 shows a particular date memory area group 7 which constitutes the summing memory 6 mentioned above. This particular date memory area group 7 consists of particular date memory areas $7_0$ to $7_{11}$ with their respective row addresses of Nos. "0" to "11". Each of these particular date memory areas $7_0$ to $7_{11}$ has a memory capacity of eight bits corresponding to its respective column address Nos. "0" to "7". In the particular date memory area $7_0$, for instance, data of the "off" days (i.e., business holidays) of the store in January of the year such as data "01", "02" and "15" are memorized with the data "01" in the address Nos. "0" and "1" in its address row, the date "02" in the address Nos. "2" and "3" and the data "15" in the address Nos. "4" and "5". Likewise, in the particular memory areas $7_1$ to $7_{11}$ date data for the "off" days of the store in February through December are successively memorized with two bits as one unit memory capacity in the address Nos. "0" to "7" in the respective address rows. In the summing memory 6 a current date memory area 8 is provided, and the date data, i.e., the day, month and year data, of the present day is memorized in this memory area.

Figure 3:
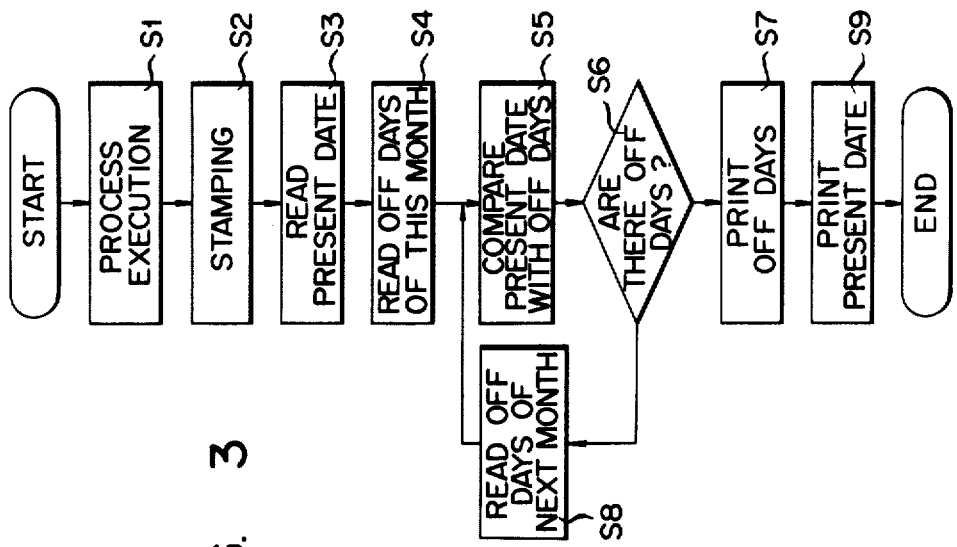
FIG. 3 is a flow chart illustrating the operation of the same embodiment.

The operation of the electronic cash register of the above construction will now be described with reference to the flow chart of FIG. 3 and the receipt sheet of FIG. 4. It is assumed that a predetermined keying operation at the time of the registering is ended after the setting of control lock into the "register" mode and that the operation keys such as cash amount tendered keys, a charge key and a credit key required for issuing a receipt is made. At this time, a step $S_1$ is executed, that is, arithmetic operations corresponding to the operated keys are executed in the CPU 5, with the result of the operations supplied through the data bus line DB to the printing buffer register PB in the I/O port 2. Then, printing drive signal MD based upon the content of the printing buffer register PB is supplied to the printing unit 4, whereby necessary data are printed on a receipt sheet as shown in FIG. 4.

Then, the operation proceeds to a step $S_2$, in which the receipt sheet is fed to a required extent, and a printing of the characters "THANK YOU FOR YOUR CONTINUOUS PATRONAGE." and the message (stored for example in an area of memory 6) "NEXT OFF DAYS" as shown in FIG. 4 is carried out. Subsequently, the operation proceeds to a step $S_3$, in which the current date data memorized in the current date memory area 8 of the summing memory 6, namely "October 21, 1979" in this case, is read out to the A register in the CPU 5 according to an address designating signal supplied from the CPU 5 through the address bus line AB. Thereafter, the operation proceeds to a step $S_4$, in which of the "off" day data memorized in the particular date memory areas in the summing memory 6 which correspond to the current month memorized in the A register in the CPU 5 are read out to the B register. In the instant case, data "25" and "26" of the "off" days memorized in the particular date memory area $7_9$ corresponding to the current month "10" are read out to the B register. Then, the operation proceeds to a step $S_5$, in which the current date data read out to the A register and the "off" day data read out to the B register are compared in the CPU 5. In the instant case, the date data "21" are compared with the date data "25" and "26". The operation then proceeds to a step $S_6$, in which whether or not data of "off" days after the date of the data in the A register is present in the B register is checked. If a decision "YES" is produced, the operation proceeds to a step $S_7$, while in case of a decision "NO" it proceeds to a step $S_8$. In the instant case, the decision "YES" is produced since the "off" days "25" and "26" are later than the current date "21", and thus the next step $S_7$ is executed. In the step $S_7$ the "off" day data "25" and "26" in the B register are extracted and transferred to the printing buffer register PB and are printed together with the month data "10" on the receipt sheet. Then the operation proceeds to a step $S_9$, in which the current date data in the A register is coupled to the printing buffer register PB and printed after the receipt sheet is fed to a predetermined extent, thus bringing an end to a series of receipt issuance operation steps. In this way, the receipt as shown in FIG. 4 is issued to the customer.

In the case where the current date data memorized in the current date memory area 8 represents November 21, 1979, the "off" day data "14" memorized in the particular date memory area $7_{10}$ is read out and written in the B register in the step $S_4$, and it is compared with the current date data "21" in the step $S_5$. In this case, a decision "NO" is produced in the step $S_6$ so that the operation proceeds to the next step $S_8$. In the step $S_8$, data of the "off" days of the month next to the month of the "off" day read out to the B register is read out from the particular date memory area for the next month and written in the B register. In the instant case, "off" day data "10" and "11" for December memorized in the particular data memory area $7_{11}$ is read out and written in the B register. Then the operation proceeds to the step $S_6$, in which a decision "YES" is produced to cause the steps $S_7$ and $S_9$ to be subsequently executed.

The "off" day data memorized in the particular date memory areas $7_0$ to $7_{11}$ in the summing memory 6 can be rewritten, if desired so, by setting the mode switch in the input section 1 to the "preset" mode and then operating desired entry keys.

While in the above embodiment data of the "off" days (i.e., business holidays) of the store are memorized in the particular date memory area group 7 for the individual months, this is by no means limitative, and it is possible to store dates of other particular days therein, such as bargain days which are desired to be informed of to the customer.

Also, while in the above embodiment the "off" days later than the current date are selected and printed, this is again by no means limitative, and it is possible to select and print the "off" days of the month corresponding to the month of the present date. In this case, characters "OFF DAYS OF THIS MONTH" are printed instead of "NEXT OFF DAYS".

What is claimed is:

1. In an electronic cash register, the improvement comprising the combination of:
   a keyboard for having entry keys for inputting sales data and particular data date;
   a central processing unit coupled to said keyboard for processing input sales data;
   current date memory means coupled to said central processing unit for storing current dates;
   particular date memory means coupled to said central processing unit for storing a plurality of particular dates written in by way of operation of said keyboard;
   message storing means for storing messages corresponding to said particular dates;
   said central processing unit including:
      a first register means for receiving current date data from said current date memory means and a second register means for receiving a particular date data from said particular date memory means;
      means for reading out said current date from said first register means in response to an operation of said keyboard to produce a sales receipt;
      means for reading out a particular date sequentially from said second register means;
      comparing means for sequentially determining whether the particular date read from said second register means is a particular date following the current date read out from said first register means everytime a particular date is read from said second register means; and
      means for extracting only those particular dates following the current date which is read out from said first register means; and
   printing means coupled to said central processing unit for issuing a sales receipt and for printing on the sales receipt the current date read out of said first register means, calculated sales data, at least one of the particular dates following said current date and at least one message, previously stored in said message storing means, corresponding to said at least one of said particular dates printed on the sales receipt.

2. The electronic cash register of claim 1, wherein said printing means includes means for printing out on the sale receipt all of the read out particular dates following said current date.

* * * * *